United States Patent
Nagata et al.

(10) Patent No.: US 7,801,439 B2
(45) Date of Patent: Sep. 21, 2010

(54) IMAGE TAKING DEVICE HAVING A DETACHABLE OPTICAL UNIT, AN ATTACHMENT AND DISPLACEMENT DETECTION UNIT, AND A CONTROL UNIT RESPONSIVE TO ATTACHMENT AND DISPLACEMENT DETECTION

(75) Inventors: Hideki Nagata, Hachioji (JP); Minoru Omaki, Kunitachi (JP); Hirofumi Tsuchida, Kunitachi (JP); Toshiyuki Nagaoka, Akishima (JP)

(73) Assignee: Olympus Corporation, Tokyo (JP)

( * ) Notice: Subject to any disclaimer, the term of this patent is extended or adjusted under 35 U.S.C. 154(b) by 226 days.

(21) Appl. No.: 11/903,148

(22) Filed: Sep. 19, 2007

(65) Prior Publication Data

US 2008/0075450 A1 Mar. 27, 2008

(30) Foreign Application Priority Data

Sep. 26, 2006 (JP) ............................. 2006-260323

(51) Int. Cl.
*G03B 7/26* (2006.01)
(52) U.S. Cl. .................... 396/301; 396/529; 396/532
(58) Field of Classification Search ................... None
See application file for complete search history.

(56) References Cited

U.S. PATENT DOCUMENTS

| | | | | |
|---|---|---|---|---|
| 5,012,264 A * | 4/1991 | Nagano et al. | ............... | 396/301 |
| 5,122,880 A * | 6/1992 | Nagano | ............... | 348/333.13 |
| 5,613,171 A * | 3/1997 | Aihara et al. | ............... | 396/531 |
| 5,640,619 A * | 6/1997 | Takayama et al. | ........... | 396/137 |
| 5,687,410 A * | 11/1997 | Sasagaki | ............... | 396/299 |
| 6,183,145 B1 * | 2/2001 | Aihara et al. | ............... | 396/529 |
| 6,392,702 B1 * | 5/2002 | Arai et al. | ............... | 348/335 |
| 6,845,218 B2 * | 1/2005 | Miyasaka et al. | ........... | 396/301 |
| 7,435,020 B2 * | 10/2008 | Kawai et al. | ............... | 396/529 |
| 7,519,291 B2 * | 4/2009 | Tokiwa et al. | ............... | 396/532 |
| 7,538,792 B2 * | 5/2009 | Takahashi | ................ | 348/207.1 |
| 2002/0015102 A1* | 2/2002 | Itoh et al. | ............. | 348/333.06 |
| 2007/0166027 A1* | 7/2007 | Misawa | ...................... | 396/529 |
| 2007/0280673 A1* | 12/2007 | Mikami et al. | ............... | 396/354 |

FOREIGN PATENT DOCUMENTS

| | | |
|---|---|---|
| JP | 9-5850 | 1/1997 |
| JP | 2006-171355 | 6/2006 |

* cited by examiner

*Primary Examiner*—W. B. Perkey
*Assistant Examiner*—Bret Adams
(74) *Attorney, Agent, or Firm*—Kenyon & Kenyon LLP

(57) ABSTRACT

There is provided an image taking device with removable optical unit, with which it is possible to operate the power supply of the image taking device body without operating a power switch, and operation of the power supply of the image taking device body is made easy. The image taking device with removable optical element is provided with an image taking device body, a lens unit (optical unit) that is removable with respect to the image taking device body, an attachment detection unit for detecting attachment of the lens unit to the image taking device body, and a system controller (control unit) for turning a power supply of the image taking device body on upon detection of attachment of the lens unit to the image taking device body by the attachment detection unit. The system controller is configured to turn off the power supply of the image taking device body in a state where attachment of the lens unit to the image taking device body is not detected by the attachment detection unit.

5 Claims, 7 Drawing Sheets

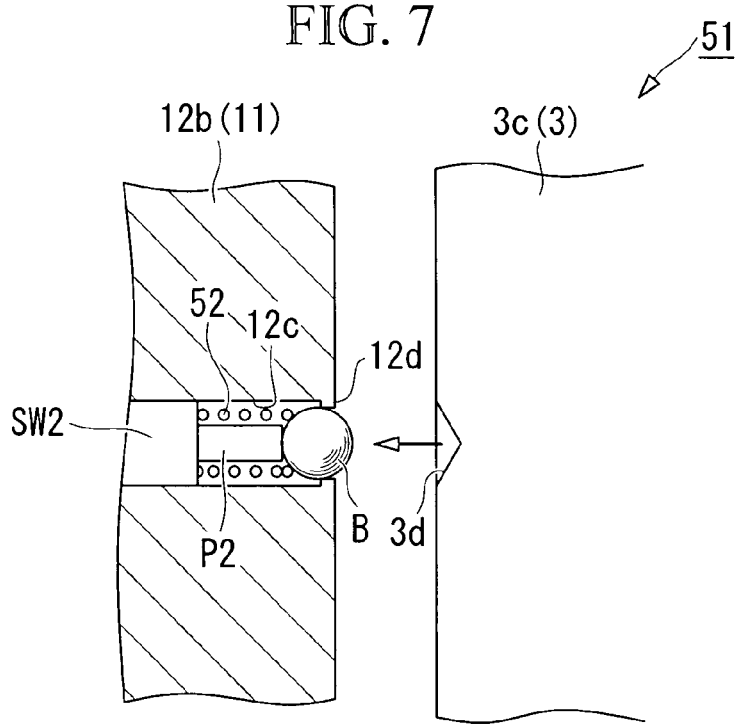
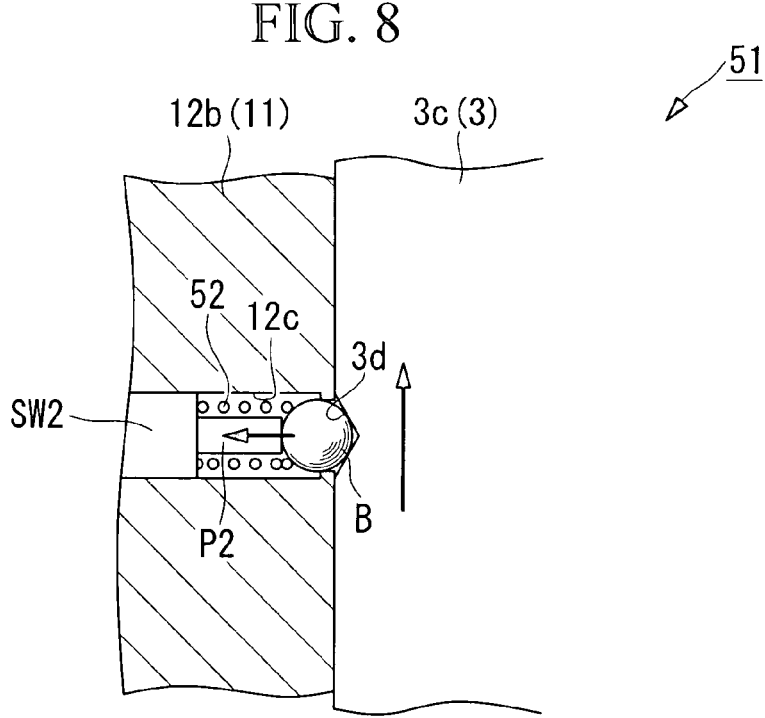

IMAGE TAKING DEVICE HAVING A DETACHABLE OPTICAL UNIT, AN ATTACHMENT AND DISPLACEMENT DETECTION UNIT, AND A CONTROL UNIT RESPONSIVE TO ATTACHMENT AND DISPLACEMENT DETECTION

BACKGROUND OF THE INVENTION

1. Field of the Invention

The present invention relates to an image taking device constructed having an optical unit that is removable with respect to the image taking device body.

This application is based on Japanese Patent Application No. 2006-260323, the content of which is incorporated herein by reference.

2. Description of Related Art

A device having an optical unit integrally provided on an image taking device body is known as an image taking device. As this type of image taking device, for example, a camera whose power supply is turned on and off by opening or closing a lens barrier, such as the camera described in Japanese Unexamined Patent Application, Publication No. 2006-171355, is known.

In a camera having a lens barrier, operations such as a user opening the lens barrier are carried out at the user's discretion when taking pictures. Specifically, with the camera described in the Japanese Unexamined Patent Application, Publication No. 2006-171355, it is possible to operate the power supply of the camera at the user's discretion, without operating a power supply switch. In this way, it is not necessary to provide a special power switch on the camera, and there are advantages that it is possible to simplify the structure of the camera, and it is possible to simplify operation of the camera.

BRIEF SUMMARY OF THE INVENTION

A first aspect is an image taking device with removable optical unit, comprising an image taking device body, an optical unit that is detachable with respect to the image taking device body, an attachment detection unit for detecting attachment of the optical unit to the image taking device body, and a control unit for turning on a power supply of the image taking device body by means of detecting attachment of the optical unit to the image taking device body by the attachment detection section.

A second aspect is the image taking device with an optical unit of the first aspect, wherein the control unit is configured to turn off the power supply of the image taking device body in a state where attachment of the optical unit to the image taking device body has not been detected by the attachment detection unit.

A third aspect is the image taking device with a removable optical unit of the first aspect, wherein the attachment detection unit has a first detection switch, provided inside the image taking device body at a position facing the optical unit at the time of attachment of the optical unit, that is operated when the optical unit is attached to the image taking device body to perform on/off switching.

A fourth aspect is the image taking device with a removable optical unit of the first aspect, wherein the optical unit can be relatively rotated with respect to the image taking device body in a state attached to the image taking device body, a displacement detecting unit is provided for detecting relative displacement of the optical unit with respect to image taking device body in a state attached to the image taking device body, and the displacement detecting unit detects one of at least information for relative rotation amount and rotation direction of the optical unit with respect to the image taking device body.

A fifth aspect is the image taking device with a removable optical unit of the fourth aspect, wherein the displacement detection unit has a roller that contacts the optical unit in a state where the optical unit is attached to the image taking device body, and rotates together with relative displacement of the optical unit with respect to the image taking device body, and a rotation detection unit for detecting at least one of information of rotation amount and rotation direction of the roller, and wherein the displacement detecting unit detects relative displacement of the optical unit with respect to the image taking unit body based on information of at least one of rotation amount and rotation direction of the roller detected by the rotation detection unit.

A sixth aspect is the image taking device with a removable optical unit of the fourth aspect, wherein the displacement detection unit has a second detection switch for performing on/off switching by causing relative displacement with respect to the image taking device body in a state where the optical unit is attached to the image taking device body, and the displacement detecting unit detects relative displacement of the optical unit with respect to the image taking unit body based on the on/off state of the second detection switch.

BRIEF DESCRIPTION OF THE SEVERAL VIEWS OF THE DRAWINGS

FIG. 7 is a drawing showing the structure of a digital still camera of a second embodiment, and the appearance of a mode switching operation of the image taking device body.

FIG. 8 is a drawing showing the appearance of a mode switching operation of the image taking device body of the digital still camera of the second embodiment.

DETAILED DESCRIPTION OF THE INVENTION

Figure 1:
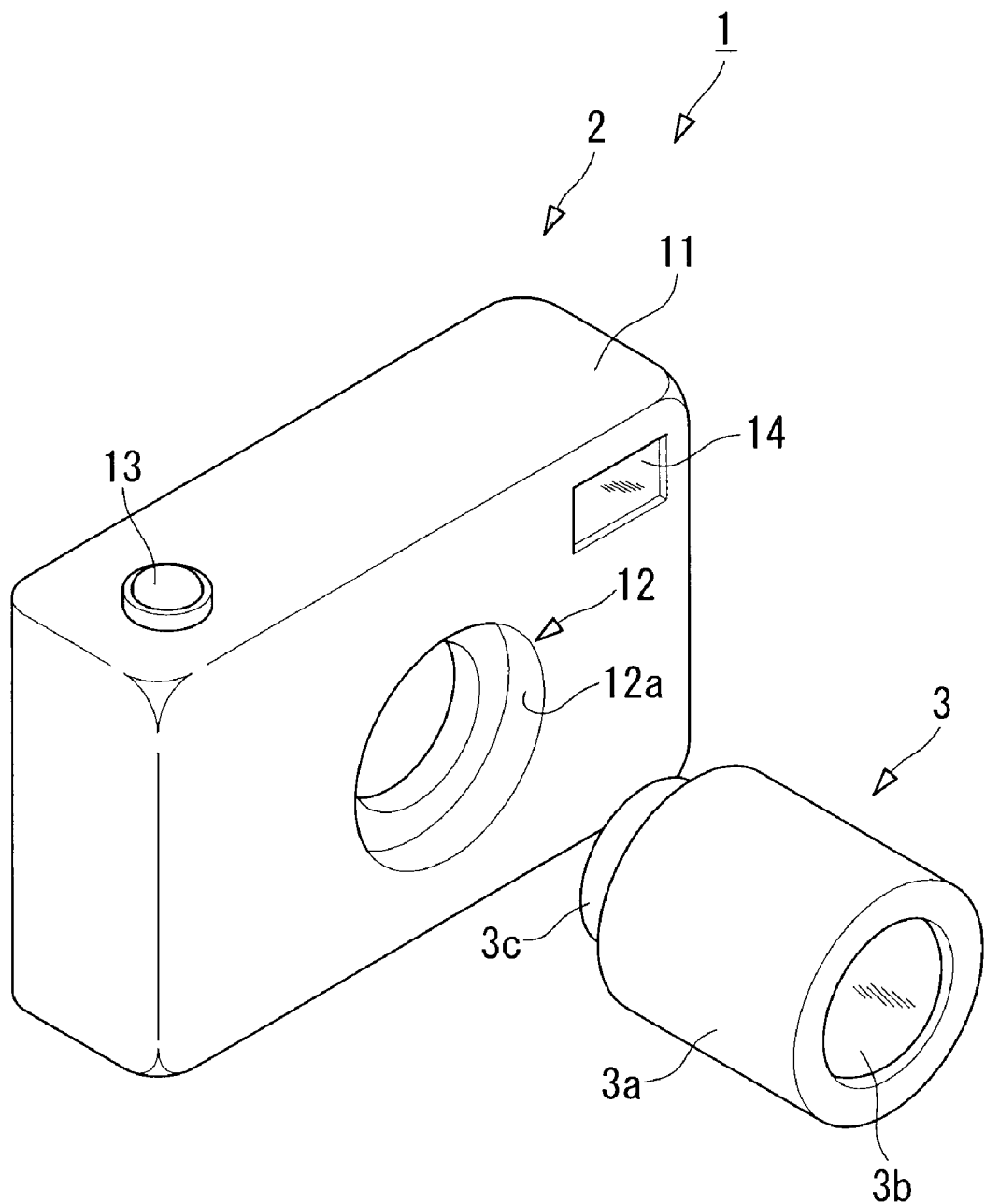
FIG. 1 is a perspective drawing showing the structure of a digital still camera (image taking device with removable optical unit) of a first embodiment.

An image taking device with removable optical element of the present invention is provided with an image taking device body, an optical unit that is removable with respect to the image taking device body, an attachment detection unit for detecting attachment of the optical unit to the image taking device body, and a control unit for turning a power supply of the image taking device body on upon detection of attachment of the optical unit to the image taking device body by the attachment detection unit.

With the image taking device with a removable optical unit constructed in this way, by attaching the optical unit to the image taking device body it is possible to detect attachment of the optical unit using the attachment detection unit. If attachment of the optical unit is detected by the attachment detection unit, the control unit turns the power supply of the image taking unit body on.

Operations such as attaching the optical unit to the image taking device body are performed at the user's discretion when using the image taking device. Therefore, by adopting a structure where the power supply of the image taking device body is turned on with attachment of the optical unit to the image taking device body in this way, it is possible to put the image taking device with removable optical unit into a usable state in accordance with the user's intentions, without operating a power switch. Specifically, with the above-described image taking device having a removable optical unit, it is possible to omit a power switch.

Also, reduction in size of image taking devices has advanced in recent years. Accompanying this, arrangement space for various switches in the image taking device has also become smaller, which means the various operating switches have been made small in size, layout freedom with respect to the various switches has been lowered, and it has become difficult to maintain operability of the image taking devices.

However, among the structural members of the image taking device, the optical unit takes up a comparatively large volume of the overall image taking device. It is therefore easy to discriminate the optical unit even by touch.

With the above-described image taking device with removable optical unit, it is possible to operate the power supply of the image taking device body by operating the optical unit that can be easily discriminated by touch. It is therefore possible, with the above-described image taking device with removable optical unit, to expeditiously operate the power supply compared to the case, for example, where a power switch is operated after visually confirming the position of the power switch, or operating the power switch by touch.

Also, while attempting to reduce the size of the image taking device, in order to maintain the operability of the image taking device it is necessary to secure sufficient installation space for the various operating switches in the image taking device body.

With the above-described image taking device with removable optical unit, since there is no need to provide a separate power switch, there is no need to secure installation space for the power switch in the image taking device body.

In this way, because it is possible to secure installation space for various operation switches, it is possible to maintain operability without miniaturizing the various operating switches while attempting to additionally reduce the size of the image taking device body, and to expect improved operability with imaginative layout of various operating switches.

The term image taking device body used here can be a configuration where it initially becomes possible to take picture upon attaching a removable optical unit. Also, the image taking device body can refer to a structure where an imaging optical system configured to be able to take pictures on a stand alone basis is incorporated, and image taking functions are expanded by the attachment of a removable optical unit.

Also, with the above-described image taking device with a removable optical unit, it is possible to have a configuration where the power supply of the imaging device body is turned off in a state where attachment of the optical unit to the image device body has not been detected by the attachment detection section.

In this case, by removing the optical unit from the imaging taking device body, attachment of the optical unit is no longer detected by the attachment detection unit. If attachment of the optical unit is no longer detected by the attachment detection unit, the control unit turns the power supply of the image taking unit body off.

Operations such as removing the optical unit from the image taking device body are carried out at the user's discretion when they have finished using the device. Therefore, by adopting a structure where the power supply of the image taking device body is turned off with removal of the optical unit from the image taking device body in this way, it is possible to turn off the power supply of the image taking device with removable optical unit in accordance with the user's intentions, without operating a power switch.

It is also possible, with the above-described image taking device with removable optical unit, to operate the power supply of the image taking device body by operating the optical unit that is capable of being easily discriminated, and so it is possible to expeditiously operate the power supply compared to the case, for example, where a power switch is operated after visually confirming the position of the power switch, or operating the power switch by touch.

Also, with the above-described image taking device with a removable optical unit, it is possible to have a structure where the attachment detection unit has a first detection switch provided inside the image taking device body at a position facing the optical unit when attached to the image taking device body, to perform on/off switching.

In this case, the detection unit detects attachment of the optical unit to the image taking device body based on the on/off state of the first detection switch. In this way, the structure of the detection unit is simplified and manufacturing cost is reduced.

Also, the first detection switch is provided inside the image taking device body at a position facing the optical unit at the time of attachment of the optical unit. Specifically, the first detection switch is provided inside the image taking device body, at a position obscured by the optical unit at the time of attachment of the optical unit (dead space). Therefore, even if the first detection switch is provided, no installation space for other operating switches is sacrificed in the image taking device body, and it is possible to maintain operability.

It is also possible to have a structure where, in the above-described image taking device with a removable optical unit, the optical unit is capable of relative rotation with respect to the image taking device body in a state attached to the image taking device body, displacement detection unit is provided for detecting relative displacement of the optical unit with respect to the image taking device body, in a state attached to the image taking device body, and the displacement detection unit detects at least one of relative rotation amount and rotation direction of the optical unit with respect to the image taking device body.

In this case, after the optical unit has been attached to the image taking device body and the power supply of the image taking device body is turned on, by relatively rotating the optical unit with respect to the image taking device body, this relative rotation is detected in the displacement detection unit. If relative rotation of the optical unit with respect to the image taking device body is detected by the displacement detection unit, the control unit switches the operating mode of the image taking device body.

In this way, it is possible to perform switching of the operating mode of the image taking device body without operating an operating mode changing switch etc.

Also, the user retains the image taking device body and the optical unit when the optical unit is attached to the image taking device body. Therefore, after carrying out an operation to attach the optical unit to the image taking device body, the user can speedily cause relative rotation of the image taking device body and the optical unit without repositioning the image taking device with removable optical unit. Specifically, the user can perform switching to a desired operating mode seamlessly together with turning on the power supply of the image taking device body.

With the above-described image taking device with removable optical unit, therefore, compared to the case where the image taking device with removable optical unit is repositioned after attaching the optical unit to the image taking device body and then operating an operating mode change switch etc. it is possible to smoothly carry out the operation of the image taking device with removable optical unit.

Here, as a structure allowing relative rotation of the optical unit with respect to the image taking device body, it is possible to adopt a structure where the optical unit rotates around its optical axis. In this case, since it is possible to perform switching of the operating mode of the image taking device body without shifting the optical axis of the optical unit, it is possible to take pictures immediately when transferring to picture taking mode.

It is also possible to have a structure where, in the above-described image taking device with a removable optical unit, the displacement detection unit is provided with a roller that is in contact with the optical unit, in a state where the optical unit is attached to the image taking device body, and rotates according to relative displacement of the optical unit with respect to the image taking device body, and a rotation detection unit for detecting information of at least one of rotation amount and rotation direction of the roller, and the displacement detection unit detects relative displacement of the optical unit with respect to the image taking device body based on the information of at least one of the rotation amount and rotation direction of the roller detected by the rotation detection unit.

In this case, the optical unit is in contact with the roller in a state where the optical unit is attached to the image taking device body. This roller rotates in accordance with relative displacement between the image taking device body and the optical unit.

Information on at least one of the rotation amount and rotation direction of the roller at this time is detected by the rotation detection unit. The displacement detecting unit detects relative displacement of the optical unit with respect to the image taking unit body based on the information on at least one of the rotation amount and rotation direction of the roller that has been detected by the rotation detection unit.

The roller is provided inside the image taking device body at a position facing the optical unit at the time of attachment of the optical unit. Specifically, the roller is provided at a position that is obscured by the optical unit at the time the optical unit is attached (dead space), which means that even if the roller is provided it is possible to maintain operability without sacrificing installation space for other operating switches etc. in the image taking device body.

It is also possible to have a structure where, in the above-described image taking device with a removable optical unit, the displacement detection unit has a second detection switch that is switched on and off by relative displacement of the optical unit with respect to the image taking device body in a state attached to the image taking device body, and the displacement detection unit detects relative displacement of the optical unit with respect to the image taking device body based on the on/off state of the second detection switch.

In this case, since relative rotation of the optical unit with respect to the image taking device body is detected based on the on/off state of the second detection switch, the structure of the displacement detection unit is simplified and the manufacturing cost is reduced.

Also, the second detection switch is provided inside the image taking device body at a position facing the optical unit at the time of attachment of the optical unit. Specifically, the second detection switch is provided inside the image taking device body, at a position obscured by the optical unit at the time of attachment of the optical unit (dead space). Therefore, even if the second detection switch is provided, no installation space for other operating switches is sacrificed in the image taking device body, and it is possible to maintain operability.

Here, it is also possible to have a structure where a plurality of second detection switches are provided in the image taking device body, with an on/off pattern of these second detection switches being changed in accordance with amount of relative displacement of the optical unit with respect to the image taking device body, and the displacement detection unit detects relative displacement of the optical unit with respect to the image taking device body based on the on/off pattern of these second detection switches.

In this case, a plurality of on/off patterns of the second detection switches are prepared, and it is possible to carry out switching of operating modes between three or more operating modes by making respective operating modes correspond to each pattern.

According to the above-described image taking device with removable optical unit, since it is possible to operate the power supply of the image taking device body in accordance with the user's intention without operating a power switch, operation of the power supply of the image taking device body becomes easy.

Embodiments will be described in the following using the drawings.

FIRST EMBODIMENT

With this embodiment, an example of an image taking device with removable optical unit applied to a digital still camera will be described.

As shown in the perspective drawing of FIG. 1, a digital still camera 1 (image taking device with removable optical unit) comprises an image taking device body 2, and a lens unit 3 (optical unit) that is removable with respect to the imaging device body 2.

Here, with this embodiment, the image taking device body 2 is configured to be able to take pictures only when the lens unit 3 is attached thereto. Incidentally, the image taking device body 2 can also be a structure where an imaging optical system configured to be able to take pictures on a stand alone basis is incorporated, and image taking functions are expanded by the attachment of the lens unit 3.

As shown in FIG. 1, the image taking device body 2 has a casing 11 defining a box shape. An opening section 12 linking to the inside of the casing 11 is provided in the front surface side of the casing 11. The inner surface of the opening section 12 is a cylindrical surface, and an expanded diameter section 12a is provided at an end section of the outer surface side of the cylinder.

Also, various operation switches 13 such as a release switch, and a strobe light section 14 are provided on the outer surface of the casing 11. Further, an image information display panel for displaying various image information, and indicator lamps 15 (refer to the block diagram of FIG. 2) for representing various information such as the status of the image taking device body 2, etc. are provided on the outer surface of the casing 11.

Figure 2:
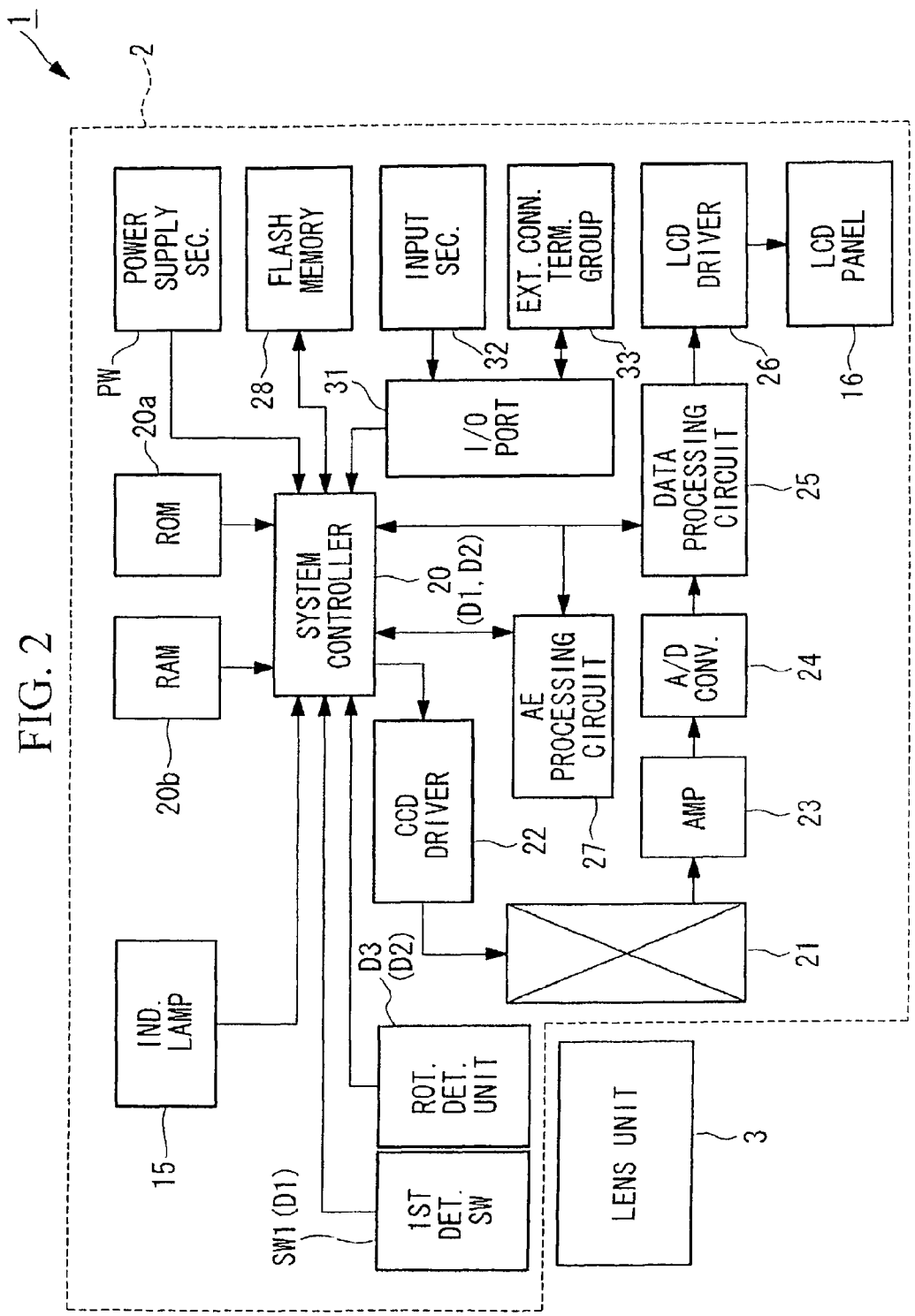
FIG. 2 is a block diagram showing the structure of a digital still camera of a first embodiment.

Here, as an image information display panel, it is possible to use an arbitrary structure such as, for example, an LCD (Liquid Crystal Display) panel, or an organic or inorganic EL (electroluminescence) display panel. With this embodiment, as shown in FIG. 2, an LCD panel 16 is used as the image information display panel.

As shown in FIG. 1, the lens unit 3 has a substantially cylindrical lens housing 3a, and an optical lens 3b provided inside the lens housing 3a. An attachment section 3c for attachment to the image taking device body 2 is provided at one end of the lens housing 3a. The attachment section 3c is formed into a cylinder that is substantially coaxial with the lens housing 3a.

The outer diameter of the attachment section 3c is made slightly smaller than the inner diameter of the expanded diameter section 12a, and it is possible to insert this attachment section 3c into the expanded diameter section 12a.

The lens unit 3 is removably attached to the casing 11 by engaging the attachment section 3c in the expanded diameter section 12a, or fixing using a not shown fixing device. With this embodiment, the lens unit 3 is fixed to the casing 11 by an adsorption fixing unit that uses a magnet.

Figure 5:
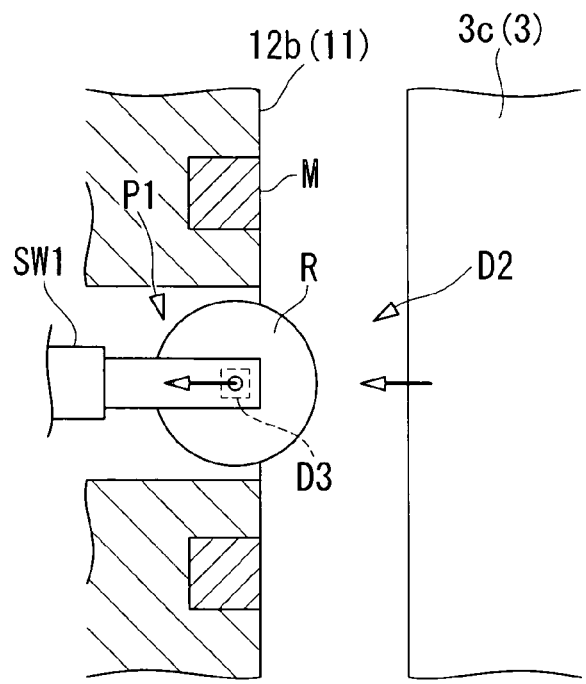
FIG. 5 is a drawing showing the appearance of a mode switching operation of the image taking device body of the digital still camera of the first embodiment.

Specifically, as shown in FIG. 5, as a fixing device, a magnet M is provided on a member of one of the casing 11 and the lens unit 3, and a magnet or magnetic material is provided on the other member, and the lens unit 3 is fixed to the casing 11 by adsorptive power of the magnet M. In FIG. 5, an example is shown where the magnet M is provided on the casing 11, and at least a part of the attachment section 3c of the lens unit 3 that contacts the casing 11 is itself constructed using a magnetic material.

Here, as the fixing unit it is possible to use any other configuration besides the adsorption type fixing device that uses a magnet, as described above, such as, for example, a bayonet type fixing device or a screw-in type fixing device.

The lens unit 3 is capable of relative displacement with respect to the image taking device body 2 in a state attached to the image taking device body 2. Here, the nature of the relative displacement between the image taking device body 2 and the lens unit 3 can adopt an arbitrary nature, such as relative sliding, relative rotation or relative attitude change (change in attachment angle or the like) between the image taking device body 2 and the lens unit 3. With this embodiment, the image taking device body 2 and the lens unit 3 are capable of relative rotation about the optical axis of the lens unit 3 (namely about the axis of the lens housing 3a).

The overall structure of the image taking device body 2 will be described in the following.

The image taking device body 2 comprises a power supply section PW for supplying power to each of the devices constituting the image taking device body 2, a system controller 20 (control unit) constituted by a CPU (central processing unit), and for carrying out control of each section of the digital still camera 1, a ROM 20a for previously stored with programs for control sequences for controlling operations of the system controller 20 and various control parameters etc., and RAM 20b used as a work area for temporarily storing data required in implementing various sequences by the system controller 20.

Also, an attachment detection unit D1 for detecting attachment of the lens unit 3 to the image taking device body 2, and a displacement detection unit D2 for detecting relative displacement of the lens unit 3 with respect to the image taking device body 2 in a state attached to the image taking device body 2, are provided in the image taking device body 2.

The system controller 20 controls operation of the power supply section PW, to control supply of power to each device constituting the image taking device body 2.

Specifically, the system controller 20 turns the power supply of the image taking body 2 on (carries out supply of power to each device from the power supply section PW) upon detection that the optical unit has been attached to the image taking device body 2 by the attachment detection unit D1. Also, the system controller 20 turns the power supply of the image taking body 2 off (supplies power to from the power supply section PW to only the system controller 20 and the first detection switch SW1) in a state where it is not detected by the attachment detection unit D1 that the optical unit has been attached to the image taking device body 2.

Also, the system controller 20 carries out predetermined processing by reading out programs and parameters from the ROM 20a once the power supply of the image taking device body 2 is turned on. In this way, the systems of the digital still camera 1 are launched, and electrically a picture taking possible state is entered.

Here, the image taking device body 2 has a plurality of operating modes. As operating modes of the image taking device body 2, in addition to a photographing mode, for example, it is possible to provide a playback mode for displaying taken images etc. on the LCD panel 16, a setting mode for carrying out various operation settings of the image taking device body 2, and arbitrary operating modes.

With the power supply of the image taking device body 2 in an on state, the system controller 20 switches the operating modes of the image taking device body 2 based on information of at least one of relative displacement amount and displacement direction of the lens unit 3 with respect to the image taking device body 2 detected by the displacement detection unit D2.

The structure of the attachment detection unit D1 and the displacement detection unit D2 will be described in detail in the following.

In the image taking device body 2, a first detection switch SW1 that is switched on and off by the lens unit 3 at the time of attachment of the lens unit 3 to the image taking device body 2 is provided at a position facing the lens unit 3 at the time of attachment of the lens unit 3.

The system controller 20 is configured to detect attachment of the lens unit 3 to the image taking device body 2 based on the on/off state of the first detection switch SW1. Specifically, the first detection switch SW1 and the system controller 20 constitute an attachment detection unit D1.

Figure 3:
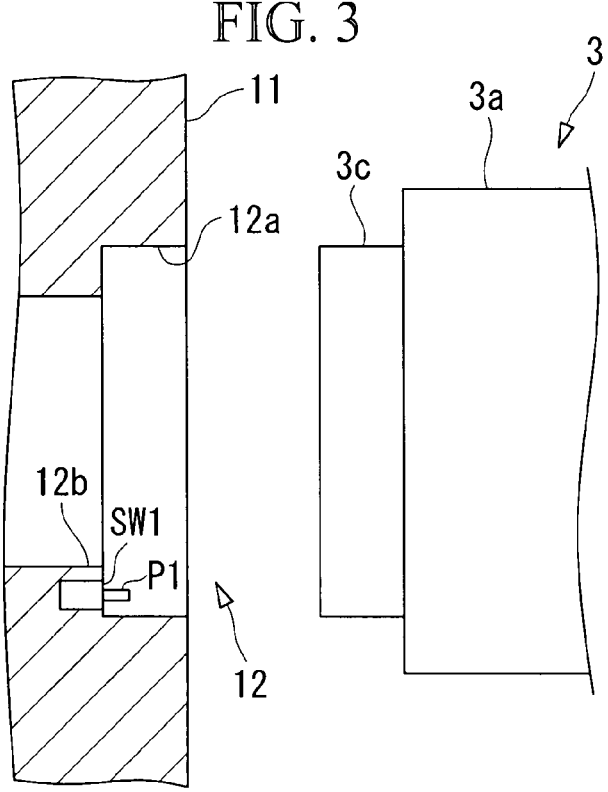
FIG. 3 is a drawing showing the appearance of operation of a power supply of the image taking device body of the digital still camera of the first embodiment.
Figure 4:
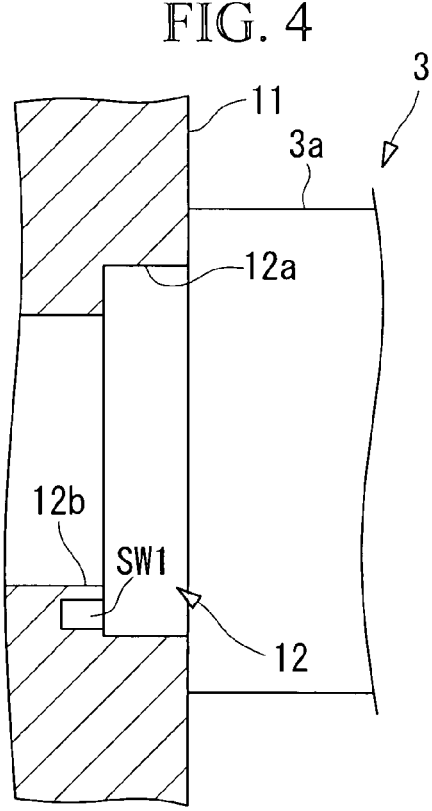
FIG. 4 is a drawing showing the appearance of operation of a power supply of the image taking device body of the digital still camera of the first embodiment.

With this embodiment, as shown in FIG. 3 and FIG. 4, the first detection switch SW1 is constructed using a push switch provided in a stepped section 12b formed at a rear end of the expanded diameter section 12a, inside the opening section 12 of the image taking device body 2. The first detection switch SW1 is recessed in the stepped section 12b so that a section to be operated P1 is positioned in the opening direction of the opening section 12. In this way, if the attachment section 3c of the lens unit 3 is inserted into the expanded diameter section 12a, as shown in FIG. 4, the section to be operated P1 is pressed by the leading surface of the attachment section 3c, and the on/off state of the first detection switch SW1 is switched.

Figure 6:
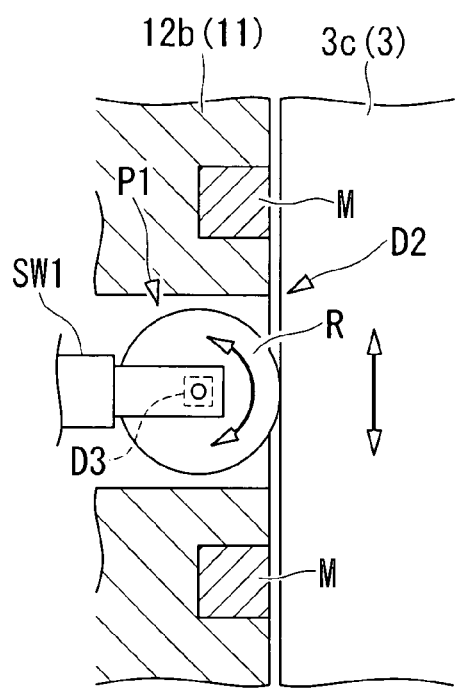
FIG. 6 is a drawing showing the appearance of a mode switching operation of the image taking device body of the digital still camera of the first embodiment.

Also with this embodiment, as shown in FIG. 5 and FIG. 6, a roller R that contacts the lens unit 3 in a state where the lens unit 3 is attached and is rotated in accordance with relative displacement of the lens unit 3 with respect to the image taking device body 2, and a rotation detection unit D3 for detecting information of at least one of rotation amount and rotation direction of the roller R, are provided in the image taking device 2. It is possible to adopt an arbitrary structure, such as a rotary encoder, for example, as the rotation detection unit D3.

The system controller 20 is configured to detect relative displacement of the lens unit 3 with respect to the image taking unit body 2, based on the information of at least one of the rotation amount and rotation direction of the roller R that has been detected by the rotation detection unit D3. Specifically, the roller R, rotation detection unit D3 and the system controller 20 constitute a displacement detection unit D2.

With this embodiment, as shown in FIG. 5, the roller R constitutes part of the section to be operated P1 of the first detection switch SW1, and is capable of rotating about an axis that is substantially orthogonal to the attachment direction of the lens unit 3 to the image taking device body 2. In this way, as shown in FIG. 6, in a state where the lens unit 3 is attached to the image taking device body 2, the roller R is pressed by the attachment section 3c of the lens unit 3, together with the section to be operated P1 of the first detection switch SW1. In this state, the on/off state of the first detection switch SW1 is switched, and the roller R comes into contact with the leading surface of the attachment section 3c of the lens unit 3.

In this state, if the image taking device body 2 of the lens unit 3 are relatively rotated about the optical axis of the lens unit 3, the roller R rotates with them. At least one of the rotation amount and rotation direction of the roller R at this time is detected by the rotation detection unit D3. The displacement detection unit D2 then detects relative displacement of the lens unit 3 with respect to the image taking device body 2 upon detection of rotation amount and rotation direction of the roller R by the rotation detection unit D3.

The detailed structure of the image taking device body 2 will be described in the following.

As shown in FIG. 2, an image sensor 21 is arranged in the image taking device body 2, at the rear of the lens unit 3. In this way, a subject image is formed on the light receiving area of the image sensor 21 by the lens unit 3.

It is possible to adopt an arbitrary sensor as the image sensor 21, such as a sensor using a CCD (charge Coupled Devices) or a sensor using CMOS (Complimentary Metal Oxide Semiconductor). With this embodiment, an image sensor using CCD is used as the image sensor 21.

A CCD driver 22 for driving the image sensor 21 is provided in the image taking device body 2. In this way, the image sensor 21 converts an optical subject image acquired by means of the lens unit 3 to an electrical image signal, and outputs the electrical image signal.

An amplifier 23 for amplifying the image signal output by the image sensor 21, and an A/D converter 24 for digitally converting the output of the amplifier 23, are provided in the image taking device body 2.

Tiny micro color filters for R, G and B are arranged in a matrix shape on the light receiving surface of the image sensor 21. A photographing signal serially output from the image sensor 21 for each color corresponding to each micro color filter is amplified to an appropriate level by the amplifier 23, and then digitally converted by the A/D converter 24 and made into respective pixel data for red, green and blue.

A data processing circuit 25 for performing various data processing, such as white balance adjustment and gamma correction for the image data acquired by the image sensor 21, and an LCD driver 26 for displaying the image data that has been subjected to processing by the data processing circuit 25 on the LCD panel 16 as image information, are provided in the image taking device body 2. In the event that the image taking device body 2 is in photographing mode, image data from the A/D converter 24 is input to the data processing circuit 25, image data for a single image portion that has been subjected to necessary processing by this data processing circuit 25 is sent to the LCD driver 26 one after the other. In this way, a subject image being taken is displayed on the LCD panel 16. Incidentally, when in photographing mode, the system controller 20 is capable of switching to display mode for displaying an image being taken by the image sensor 21 on the LCD panel 16, and non-display mode where an image being photographed is not displayed on the LCD panel 16.

Also, an AE processing circuit 27 for carrying out automatic exposure control (AE control) at the time of photography is provided in the image taking device body 2. Image data from the data processing circuit 25 is also sent to the AE processing circuit 27. This AE processing circuit 27 calculates a photometry value for subject brightness of the image sensor 21 based on respectively input various image data, and charge accumulation time of the image sensor 21 set in the CCD driver 22 at that point in time, namely, the shutter speed of an electronic shutter. The system controller 20 then determines a new shutter speed of the electronic shutter based on this photometry value, and feeds back this shutter speed to the CCD driver 22, to thus adjust drive of the image sensor 21 and carry out AE control.

As described above, with this digital camera 1, subject brightness is determined using a TTL (Through The Lens) photometry method with the image sensor 21 as a light receiving sensor. It is also possible to change shutter speed of the electronic shutter and aperture value. If the aperture value is changed, obviously a photometry value is calculated according to subject brightness with aperture value added.

An external storage unit for storing image data output from the data processing circuit 25 is provided in the image taking device body 2. In this embodiment, flash memory 28 has been used as the external storage unit. This flash memory 28 is removably provided with respect to the image taking device body 2.

An I/O port 31 for carrying out exchange of data between the system controller 20 and other components is provided in the image taking device body 2. An input section 32 for receiving user input, and an external connection terminal group 33 for connection of external components, are provided in the I/O port 31.

The input section 32 is made up of, for example, a release switch, zoom lever, key operation sections etc., and signals corresponding to operation of these sections are input to the system controller 20 via the I/O port 31. The system controller 20 carries out various processing and control according to the input signals. The external connection terminal group 33 is made up of a memory slot for attachment of a memory card, being an external storage section, and connectors for connecting to an external computer. By connecting an external storage device and a computer to this external connection terminal group 33, it is possible to carry out input and output of data via the I/O port 31.

Here, at the time of playback mode, the system controller 20 reads out image data constituting an object for display from the flash memory 28 or the external storage device connected to the external connection terminal group 33, based on user instructions input to the input section 32, and transmits the image data to the data processing circuit 25. In this way, image data of the display object is sent to the LCD driver 26, and the image is displayed on the LCD panel 16.

With the digital still camera 1 constructed in this way, as described previously, by attaching the lens unit 3 to the image taking device body 2, the system controller 20 turns the power supply of the image taking device body 2 on.

Operations such as attaching the lens unit 3 to the image taking device body 2 are based on the user's intentions when using the image taking device and the optical unit. Therefore, with this digital still camera 1, it is possible to turn the power supply on in accordance with the intentions of the user, without operating a power supply switch.

Also, with this digital still camera 1, as described previously, the system controller 20 is configured to turn the power supply of the image taking device body 2 off in a state where attachment of the lens unit 3 to the image taking device body 2 is not detected by the attachment detection section D1.

Operations such as removing the lens unit 3 from the image taking device body 2 are carried out at the user's discretion when they have finished using them.

In this manner, with this digital still camera 1, since it is possible to operate the power supply of the image taking device body 2 according to the user's intention without operating a power switch, operation of the power supply of the image taking device body 2 becomes easy.

Also, in this way, with the digital still camera 1, since a power supply switch is not required, there is no need to secure installation space for the power supply switch in the image taking device body 2. It is therefore possible to secure installation space for various operation switches 13. By doing this, with this digital still camera 1, it is possible to maintain operability without miniaturizing the various operating switches 13 while attempting to additionally reduce the size of the image taking device body 2, and to expect improved operability with imaginative layout of various operating switches 13.

Also with this digital still camera, as described above, it is possible to operate the power supply of the image taking device body 2 by operating the lens unit 3 that occupies a comparatively large volume in the device overall, and is capable of being easily discriminated by touch. It is therefore possible, with this digital still camera 1, to expeditiously operate the power supply compared to the case, for example, where a power switch is operated after visually confirming the position of the power switch, or operating the power switch by touch.

Also, with this digital still camera 1, the attachment detection section D1 is configured to detect attachment of the lens unit 3 to the image taking device body 2 based on an on/off state of the first detection switch SW1 provided in the image taking device body 2 at a position facing the lens unit 3 at the time of attachment of the lens unit 3.

In this way, since attachment of the lens unit 3 to the image taking device body 2 is detected based on the on/off state of the first detection switch SW1, the structure of the attachment detection section D1 is simplified and the manufacturing cost is reduced.

Also, the first detection switch SW1 is provided inside the image taking device body 2 at a position facing the lens unit 3 at the time of attachment of the lens unit 3. Specifically, the first detection switch SW1 is provided inside the image taking device body 2, at a position obscured by the lens unit 3 at the time of attachment of the lens unit 3 (dead space). Therefore, even if the first detection switch SW1 is provided, no installation space for other operation switches 13 etc. is sacrificed in the image taking device body 2, and it is possible to maintain operability.

Also, with this digital still camera 1, as described above, by rotating the lens unit 3 relative to the image taking device body 2 in a state where the lens unit 3 is attached to the image taking device body 2, the system controller 20 switches the operation modes of the image taking device body 2.

In this way, it is possible to perform switching of the operating mode of the image taking device body 2 without operating an operating mode changing switch etc.

In this way, with this digital still camera 1, since it is possible to change the operating mode without operating an operating mode changing switch, there is no need to provide a switch for changing the operating modes.

It is therefore not necessary to secure installation space for types of switch for changing the operating mode in the image taking device body 2. As a result, it is possible to secure installation space for various operation switches 13. By doing this, with this digital still camera 1, it is possible to maintain operability without miniaturizing the various operating switches while attempting to additionally reduce the size of the image taking device body 2, and to expect improved operability with imaginative layout of various operating switches 13.

Also with this digital still camera 1, as described above, it is possible to activate the operating modes of the image taking device body 2 by operating the lens unit 3 that occupies a comparatively large volume in the device overall and is capable of being easily discriminated by touch. It is therefore possible, with this digital still camera 1, to easily perform switching to a desired operating mode compared to the case, for example, where a mode changing switch etc. is operated after visually confirming the position of the switch, or operating the mode changing switch etc. by touch.

Also, when attaching the lens unit 3 to the image taking device body 2, the user holds the image taking device body 2 and the lens unit 3 in separate hands. Therefore, after carrying out an operation to attach the lens unit 3 to the image taking device body 2, the user can speedily cause relative rotation of the image taking device body 2 and the lens unit 3 without repositioning the digital still camera 1. Specifically, the user can perform switching to a desired operating mode seamlessly with turning on the power supply of the image taking device body 2.

With this digital still camera 1, therefore, compared to the case where the digital still camera 1 is repositioned after attaching the lens unit 3 to the image taking device body 2 and then operating an operating mode change switch etc. it is possible to smoothly carry out the operation of the digital still camera 1.

Also, with this embodiment, it is possible to perform operating mode changing of the image taking device body 2 by causing relative rotation of the lens unit 3, about its optical axis, with respect to the image taking device body 2.

In this way, since it is possible to perform changing of the operating mode of the image taking device body 2 without shifting the optical axis of the lens unit 3, it is possible to take pictures immediately when transferring to picture taking mode.

SECOND EMBODIMENT

Figure 9:
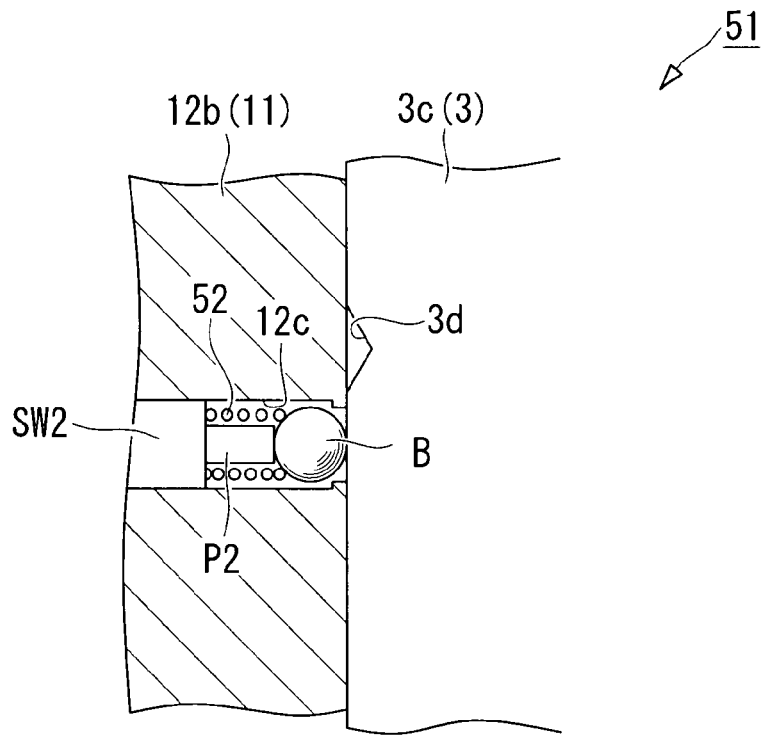
FIG. 9 is a drawing showing the appearance of a mode switching operation of the image taking device body of the digital still camera of the second embodiment.

A second embodiment will be described in the following. As shown in FIG. 7 to FIG. 9, the digital still camera 51 is mainly the digital still camera 1 shown in the first embodiment using a displacement detection unit D4 instead of the displacement detection unit D2. In the following, structures that are the same as in the first embodiment 1 use the same reference numerals, and detailed description thereof will be omitted.

With the digital still camera 51 the roller R and the rotation detection unit D3 constituting the displacement detection unit D2 are eliminated from the section to be operated P1 of the first detection switch SW1. Instead, a second detection switch SW2 whose on/off state is changed by relative displacement of the lens unit 3 with respect to the image taking device body 2 in a state attached to the image taking device body 2 is provided in the image taking device body 2. Also, with the digital still camera 51, the system controller 20 is configured to detect relative displacement of the lens unit 3 with respect to the image taking device body 2 based on the on/off state of the second detection switch SW2.

Specifically, with this digital still camera 51, the second detection switch SW2 and the system controller 20 constitute the displacement detection unit D4.

With this embodiment, the second detection switch SW2 is constructed using a push switch provided in a stepped section 12b formed at a rear end of the expanded diameter section 12a, inside the opening section 12 of the image taking device body 2. A containment hole 12c opening towards to the opening direction of the opening section 12 is provided in the stepped section 12b. The second detection switch SW2 is housed inside the containment hole 12c so that the section to be operated P2 is positioned in the opening direction of the containment hole 12c (that is, the opening direction of the opening section 12).

A ball B is arranged inside the containment hole 12c, between the section to be operated P2 of the second detection switch SW2 and the opening end of the containment hole 12c. Also, a reduced diameter section 12d is provided at the opening end of the containment hole 12c. The inner diameter of the reduced diameter section 12d is a slightly smaller diameter than the outer diameter of the ball B. In this manner, the ball B is permitted to partially protrude from the opening end of the containment hole 12c, while being held inside the containment hole 12c.

A biasing member 52 for urging the ball B towards the opening end of the containment hole 12c is also provided inside the containment hole 12c. In this embodiment, a coil spring has been used as the biasing member 52.

In this way, as long as the ball B is not subjected to external force, it is held in a state pressed to the reduced diameter section 12d of the containment hole 12c. In a state where the ball B is pressed against the opening end of the containment hole 12c in this way, part of the ball B projects further to the opening end side of the opening section 12 than the surface of the stepped section 12b.

The second detection switch SW2 is not operated in a state where the ball B is pressed to the opening end side of the containment hole 12c in this way, and when the ball B is pushed back to substantially the same position as the surface of the containment hole 12c the section to be operated P2 is pushed more deeply into the containment hole 12c together with the ball B, and the second detection switch SW2 is operated (the on/off state is switched).

On the other hand, an indented section 3d is provided in the leading surface of the attachment section 3c of the lens unit 3. With this embodiment, the inner surface of the indented section 3d is made a conical inner surface with the diameter becoming larger towards the leading surface of the attachment section 3c.

Also, a guide member (not shown) for regulating the attitude of the lens unit 3 with respect to the casing 11, when attaching the lens unit 3 to the casing 11, is provided in at least one of the casing 11 and the lens unit 3.

In this manner, the lens unit 3 is only capable of being attached to the casing 11 in a state oriented about its optical axis, with the indented section 3d oriented towards the containment hole 12c provided inside the opening section 12 of the casing 11.

In the following, an operating method for the digital still camera 51 constructed in this way will be described.

With this digital still camera 51 also, the power supply of the image taking device body 2 is turned on by attachment of the lens unit 3 to the image taking device body 2.

Here, as described above, when the lens unit 3 is attached to the image taking device body 2, then as shown in FIG. 7 the indented section 3d of the lens unit 3 faces the containment hole 12c provided inside the opening section 12 of the casing 11.

Therefore, at the point in time that attachment of the lens unit 3 to the image taking device body 2 is complete, as shown in FIG. 8, the part of the ball B that is projecting further than the surface of the stepped section 12b of the opening section 12 is contained inside the indented section 3d of the lens unit 3, In this state, since there is external force other than the urging force applied to the ball B, the ball B is held in a state pushed against the opening end of the containment hole 12c.

Here, with this embodiment, the system controller 20 is set so that the operating mode of the image taking device body 2 is made photographing mode in a state where the section to be operated P2 of the displacement detection unit D4 is not being operated. In this way, at the point in time where the lens unit 3 is attached to the image taking device body 2, since the image taking device body 2 is in photographing mode it is possible to rapidly start taking pictures.

Next, by relatively turning the lens unit 3 with respect to the image taking device body 2, then as shown in FIG. 9 the indented section 3d of the lens unit 3 is moved away from the position facing the containment hole 12c provided inside the opening section 12 of the casing 11.

In this state, the ball B is pressed back inside the containment hole 12c by the leading surface of the attachment section 3c of the lens unit 3. In this way, the section to be operated P2 is pushed more deeply into the containment hole 12c together with the ball B, and the second detection switch SW2 is operated.

With this embodiment, the system controller 20 is set so that the operating mode of the image taking device body 2 is made playback mode in a state where the second detection switch SW2 is operated.

As described above, only a part of the ball B projects from the containment hole 12c, and the inner surface of the indented section 3d is a conical inner surface that expands in diameter approaching the leading surface of the attachment section 3c. In this manner, when the lens unit 3 is caused to move relative to the image taking device body 2, since the ball B is smoothly contained inside the containment hole 12c without getting caught on the inner surface of the indented sections 3d, it is possible to smoothly carry out a mode change operation.

Then, by relatively turning the lens unit 3 with respect to the image taking device body 2, so that the indented section 3d of the lens unit 3 again faces the containment hole 12c provided inside the opening section 12 of the casing 11, part of the ball B is again contained inside the indented section 3d of the lens unit 3. In this way, the operation of the second detection switch SW2 is released and the operating mode of the image taking device body 2 is again set to photography mode.

With the digital still camera 51 constructed in this way, as described above, since detection of relative rotation of the lens unit 3 with respect to the image taking device body 2 is carried out based on the on/off state of the second detection switch SW2, the structure of the displacement detection unit is simplified and the manufacturing cost is reduced.

Also, the second detection switch SW2 is provided inside the image taking device body 2 at a position facing the lens unit 3 at the time of attachment of the lens unit 3. Specifically, the second detection switch SW2 is provided inside the image taking device body 2, at a position obscured by the lens unit 3 at the time of attachment of the lens unit 3 (dead space). Therefore, even if the second detection switch SW2 is provided, no installation space for other operation switches 13 etc. is sacrificed in the image taking device body 2, and it is possible to maintain operability.

Here, it is also possible to have a structure where a plurality of second detection switches SW2 are provided in the image taking device body 2, with an on/off pattern of these second detection switches SW2 being changed in accordance with amount of relative displacement of the lens unit 3 with respect to the image taking device body 2, and the displacement detection unit D4 detects relative displacement of the lens unit 3 with respect to the image taking device body 2 based on the on/off pattern of these second detection switches SW2.

In this case, a plurality of on/off patterns of the second detection switches SW2 are prepared, and it is possible to carry out switching of operating modes between three or more operating modes by making respective operating modes correspond to each pattern.

THIRD EMBODIMENT

A third embodiment will be described in the following.

Figure 10:
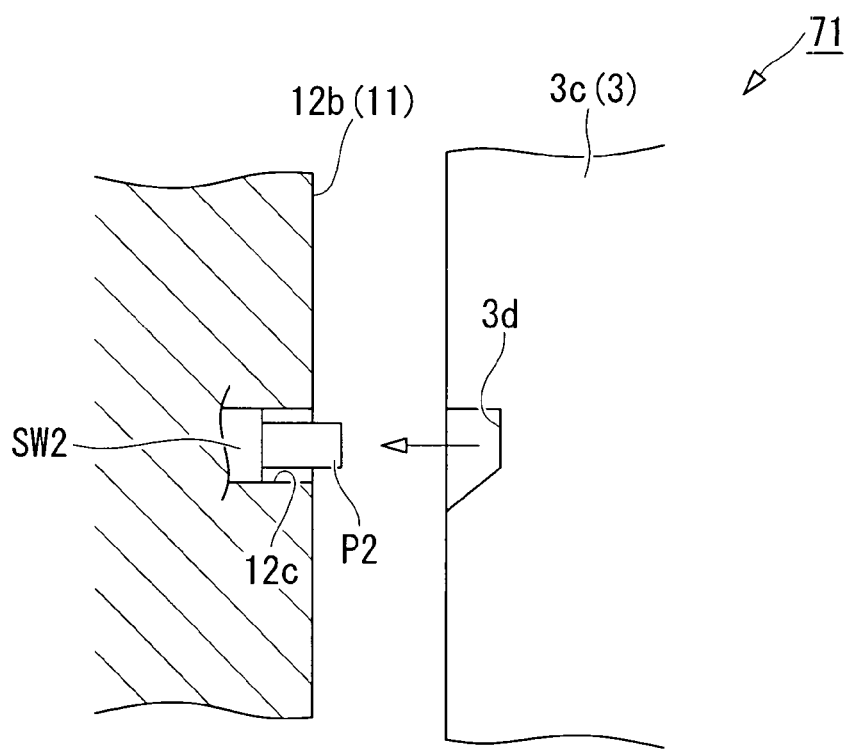
FIG. 10 is a drawing showing the structure of a digital still camera of a third embodiment, and the appearance of a mode switching operation of the image taking device body.
Figure 11:
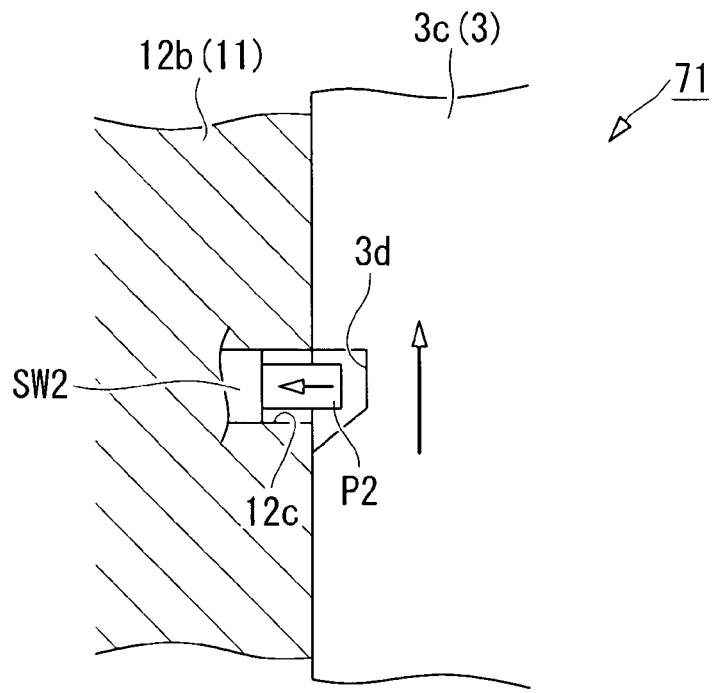
FIG. 11 is a drawing showing the appearance of a mode switching operation of the image taking device body of the digital still camera of the third embodiment.
Figure 12:
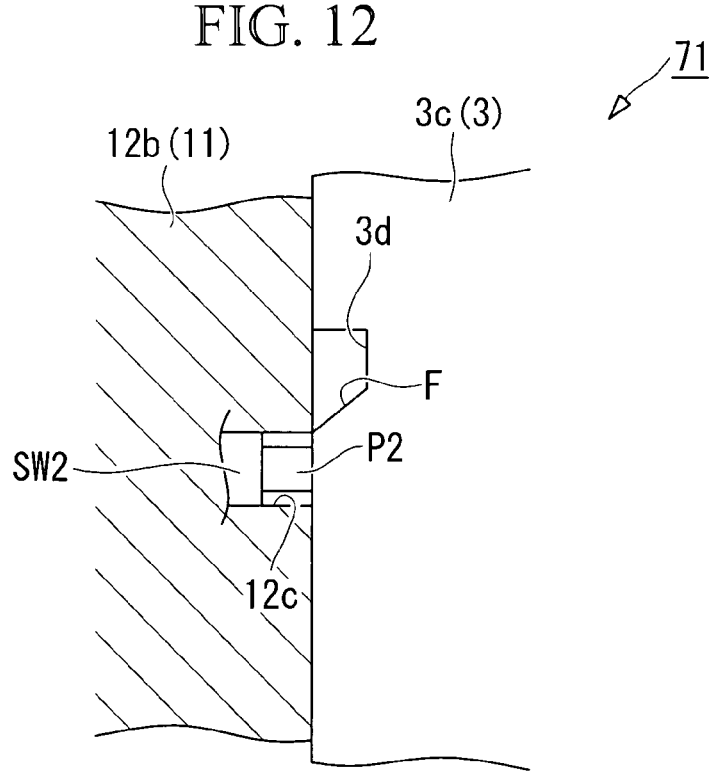
FIG. 12 is a drawing showing the appearance of a mode switching operation of the image taking device body of the digital still camera of the third embodiment.

As shown in FIG. 10 to FIG. 12, the digital still camera 71 is mainly the digital still camera 51 shown in the second embodiment, using a displacement detection unit D5 instead of the displacement detection unit D42. In the following, structures that are the same as in the second embodiment use the same reference numerals, and detailed description thereof will be omitted.

With the digital still camera 71, instead of providing the ball B and the biasing member 52 inside the containment hole 12c, the second detection switch SW2 is provided so that part of the section to be operated P2 projects from the containment hole 12c.

The second detection switch SW2 is not operated in a state where the section to be operated P2 projects from the containment hole 12c (a state where the section to be operated P2 projects further than the surface of the stepped section 12b), and is only operated (the on/off state switched) when the tip of the section to be operated P2 is pushed back to substantially the same position as the surface of the stepped section 12b.

With this embodiment, this second detection switch SW2 and the system controller 20 constitute the displacement detection unit D5.

Also, with this embodiment, at the inner surface of the indented section 3d provided at the leading surface of the attachment section 3c of the lens unit 3, a position where the section to be operated P2 of the second detection switch SW2 is received when the lens unit 3 is rotated relative to the image taking device body 2 is made an inclined surface F that is further away from the center of the indented section 3d approaching the leading surface of the attachment section 3c.

In this manner, when the lens unit 3 is rotated relative to the image taking device body 2, since the section to be operated P2 is smoothly contained inside the containment hole 12c without getting caught on the inner surface of the indented section 3d, it is possible to smoothly carry out a mode change operation According to the digital still camera 71, since structure of the displacement detection unit is further simplified, it is possible to reduce manufacturing costs.

With the above-described embodiment, an example of an image taking device with removable optical unit applied to a digital still camera has been described. However, this is not limiting, and it is also possible to apply the image taking device with a removable optical unit to various cameras such as a camera using photographic film, an instant camera using instant film, or a video camera etc.

What is claimed is:

1. An image taking device having a removable optical unit, comprising:
    an image taking device body;
    an optical unit having an optical axis that is detachable with respect to the image taking device body, and that is configured to be able to be displaced around the optical axis with respect to the image taking device body in a state where the optical unit is attached to the image taking device body;
    an attachment detection unit that is configured to detect attachment of the optical unit to the image taking device body;
    a displacement detecting unit that is configured to detect at least one of relative displacement amount and displacement direction of the optical unit around the optical axis with respect to the image taking device body in the state where the optical unit is attached to the image taking device body; and
    a control unit that is configured to turn on a power supply of the image taking device body when attachment of the optical unit to the image taking device body is detected by the attachment detection unit, to turn off the power supply of the image taking device body when attachment of the optical unit to the image taking device body is not detected by the attachment detection unit, and to switch the image taking device body between a photographing mode and a playback mode on a basis of information of at least one of the relative displacement amount and the displacement direction of the optical unit around the optical axis with respect to the image taking device body detected by the displacement detecting unit.

2. The image taking device with a removable optical unit of claim 1, wherein the attachment detection unit has a detection switch, provided inside the image taking device body at a position facing the optical unit at the time of attachment of the optical unit, that is configured to switch on the image taking device body by attachment of the optical unit to the image taking device body and to switch off the image taking device body by detachment of the optical unit from the image taking device body.

3. The image taking device with a removable optical unit of claim 1, wherein the optical unit is configured to be rotatable around the optical axis with respect to the image taking device body in the state where the optical unit is attached to the image taking device body, the displacement detecting unit is configured to detect at least one of relative rotation amount and rotation direction of the optical unit around the optical axis with respect to the image taking device body, and the control unit is configured to switch the image taking device body between the photographing mode and the playback mode in the state where the optical unit is attached to the image taking device body on a basis of information of at least one of the relative rotation amount and the rotation direction of the optical unit around the optical axis with respect to image taking device body.

4. The image taking device with a removable optical unit of claim 3, wherein the displacement detection unit has a roller that contacts the optical unit in a state where the optical unit is attached to the image taking device body, rotates together with relative displacement of the optical unit with respect to the image taking device body, and a rotation detection unit that is configured to detect at least one of rotation amount and rotation direction of the roller, and wherein the displacement detecting unit detects relative displacement of the optical unit with respect to the image taking unit body based on information on at least one of rotation amount and rotation direction of the roller detected by the rotation detection unit.

5. The image taking device with a removable optical unit of claim 4, wherein the displacement detection unit has a detection switch that is configured to be turned on and off by causing the optical unit to be displaced with respect to the image taking device body in a state where the optical unit is attached to the image taking device body, and the displacement detecting unit detects relative displacement of the optical unit with respect to the image taking unit body based on whether the detection switch is turned on or off.

\* \* \* \* \*